(12) United States Patent
Chang

(10) Patent No.: US 6,685,149 B1
(45) Date of Patent: Feb. 3, 2004

(54) ADJUSTABLE SUPPORT STAND

(75) Inventor: Lien-Wen Chang, Taipei Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 10/249,493

(22) Filed: Apr. 15, 2003

(51) Int. Cl.⁷ .............................................. F16M 11/24
(52) U.S. Cl. ...................... 248/188.2; 248/157; 353/70; 353/119
(58) Field of Search ........................... 248/188.2, 188.8, 248/188.7, 157, 649, 655, 665, 664, 292.12, 292.13, 371, 372.1, 398, 200.1, 207; 353/69, 70, 119

(56) References Cited

U.S. PATENT DOCUMENTS

| | | | |
|---|---|---|---|
| 687,620 A | * 11/1901 | Goodwin | 254/98 |
| 1,612,276 A | * 12/1926 | Fitz | 248/649 |
| 5,720,539 A | * 2/1998 | Woo | 353/69 |
| 5,813,647 A | * 9/1998 | Chen | 248/354.7 |
| 6,302,543 B1 | * 10/2001 | Arai et al. | 353/70 |
| 6,461,002 B1 | * 10/2002 | Su | 353/119 |
| 6,481,855 B2 | * 11/2002 | Oehler | 353/70 |
| 6,604,831 B1 | * 8/2003 | Prestigomo et al. | 353/119 |

* cited by examiner

Primary Examiner—Ramon O. Ramirez
Assistant Examiner—Tan Le
(74) Attorney, Agent, or Firm—Winston Hsu

(57) ABSTRACT

An adjustable support stand is used for adjusting a height of a device, the device containing a housing and a cavity in the housing. The support stand includes a ratchet casing for moving along a linear direction within the cavity of the housing, and a ratchet disposed inside the ratchet casing. The ratchet includes teeth and a protruding edge for limiting the ability of the ratchet to move in a linear direction, wherein the protruding edge moves between an inner end and an outer end of the ratchet casing. The support stand also includes a pawl for engaging the teeth of the ratchet, the pawl being connected to the housing at a pivot point for fixing the pawl to the housing and allowing the pawl to rotate about the pivot point. A base is formed on an outer end of the ratchet for supporting the device on a surface.

9 Claims, 25 Drawing Sheets

ADJUSTABLE SUPPORT STAND

BACKGROUND OF INVENTION

1. Field of the Invention

The present invention relates to a support stand, and more specifically, to a support stand of a projector for raising an angle of inclination of the projector.

2. Description of the Prior Art

Support stands are commonly used to adjust height of at least one end of a device. For example, support stands are commonly used in projectors for adjusting an angle of inclination of the projector. Please refer to FIG. 1. FIG. 1 is a diagram of a projector 10 containing a support stand 12 according to the prior art. When the projector 10 is placed on a surface 14, the support stand 12 can be extended out of or pushed into the projector 10 for raising or lowering an angle of inclination of the projector 10. The projector 10 generates light 18 that is projected on a screen 16. As is well known in the art, the support stand 12 is adjusted so that the light 18 is projected on a desired location of the screen 16.

However, after extending the support stand 12 from the projector 10, it is difficult to retract the support stand 12 back to its position inside the projector 10. Often times, two hands must be used to accomplish this, with one hand used to disengage a ratchet device on the support stand 12 and the other hand being used to push the support stand 12 back into the projector 10.

SUMMARY OF INVENTION

It is therefore a primary objective of the claimed invention to provide an adjustable support stand for adjusting height of a device in order to solve the above-mentioned problems.

According to the claimed invention, an adjustable support stand is used for adjusting a height of a device, the device containing a housing and a cavity in the housing. The support stand includes a ratchet casing capable of moving along a linear direction within the cavity of the housing, the cavity having an inner end and an outer end for limiting the ability of the ratchet casing to move within the cavity in the linear direction, and a ratchet disposed inside the ratchet casing. The ratchet includes a plurality of teeth and a protruding edge for limiting the ability of the ratchet to move in the linear direction, wherein the protruding edge moves between an inner end and an outer end of the ratchet casing. The support stand also includes a pawl for engaging the teeth of the ratchet, the pawl being connected to the housing at a pivot point for fixing the pawl to the housing and allowing the pawl to rotate about the pivot point, wherein the pawl rotates for engaging and disengaging with teeth of the ratchet. A base is formed on an outer end of the ratchet for supporting the device on a surface, wherein the ratchet is capable of being pulled outwards from the ratchet casing for raising a height of the device, and the ratchet is capable of being pushed into the ratchet casing for lowering the height of the device.

It is an advantage of the claimed invention that the support stand can be extended and retracted conveniently using one hand. It is also an advantage that that once the support stand is fully extended, the support stand can be conveniently retracted in one motion.

These and other objectives of the claimed invention will no doubt become obvious to those of ordinary skill in the art after reading the following detailed description of the preferred embodiment; which is illustrated in the various figures and drawings.

DETAILED DESCRIPTION

Figure 1:
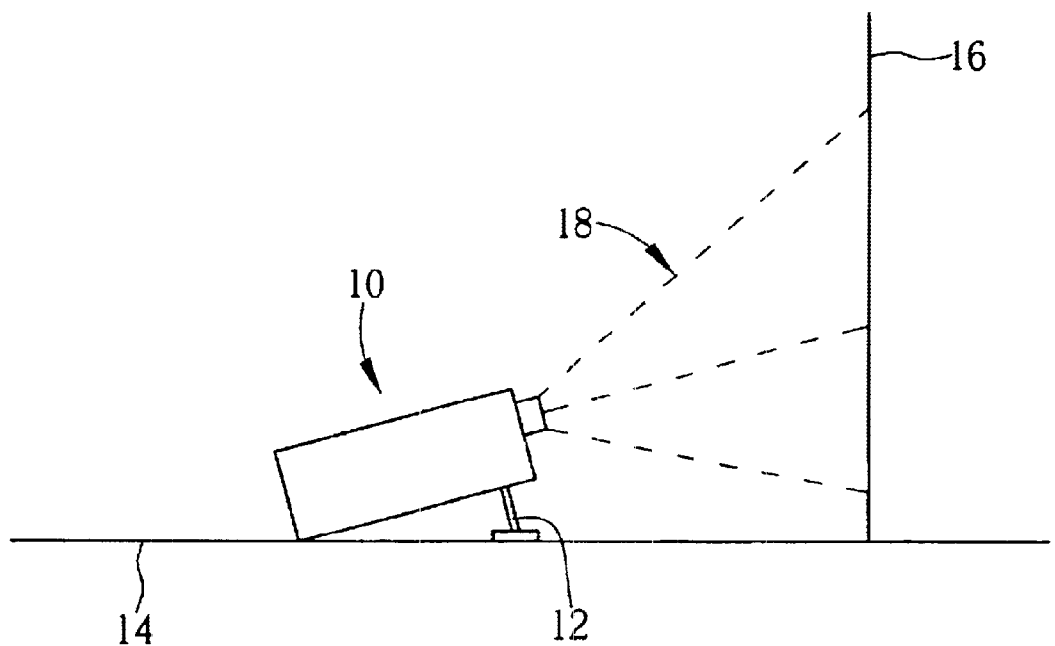
FIG. 1 is a diagram of a projector containing a support stand according to the prior art.

Please refer to FIG. 2 to FIG. 19. FIG. 2 to FIG. 7 are perspective views, FIG. 8 to FIG. 13 are side views, and FIG. 14 to FIG. 19 are top views of a support stand 100 being extended and retracted according to the present invention. The support stand 100 is formed in a cavity 104 of a housing 102 of the device to be raised. It should be noted that the support stand 100 can be used to raise the height of any device, and is not limited to being used in a projector.

As best seen in FIG. 14 to FIG. 19, a casing 110 is formed inside the cavity 104 of the housing 102. The cavity 104 is slightly longer than the casing 110 such that the casing 110 is capable of moving within the cavity 104. A ratchet 120 is formed inside the casing 110 with the ratchet 120 containing a protruding edge 124 for keeping the ratchet 120 inside the casing 110. The ratchet 120 contains a plurality of teeth 122 for adjusting a height of the support stand 100, as will be seen below.

A pawl 130 is connected to the housing 102 through a pivot point 132 in the pawl 130. The pawl 130 has a built-in spring mechanism that causes the pawl 130 to rotate towards the teeth 122 of the ratchet 120 for engaging the pawl 130 with the teeth 122. As the ratchet 120 is extended out of the casing 110, the pawl 130 engages with successive teeth 122 of the ratchet 120. A base 140 is formed at an outer end of the ratchet 120 for providing stability to the support stand 100 when it is placed on a surface.

Figure 2:
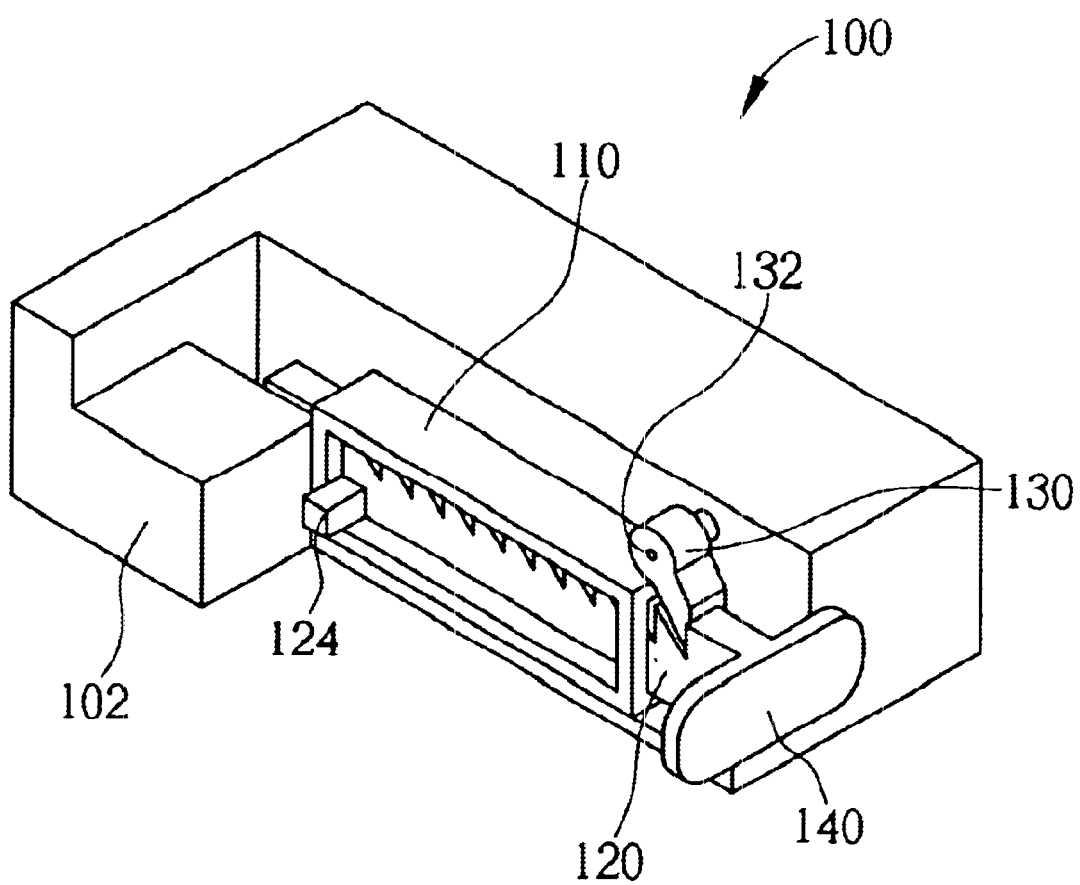
FIG. 2 to FIG. 7 are perspective views of a support stand being extended and retracted according to the present invention.
Figure 8:
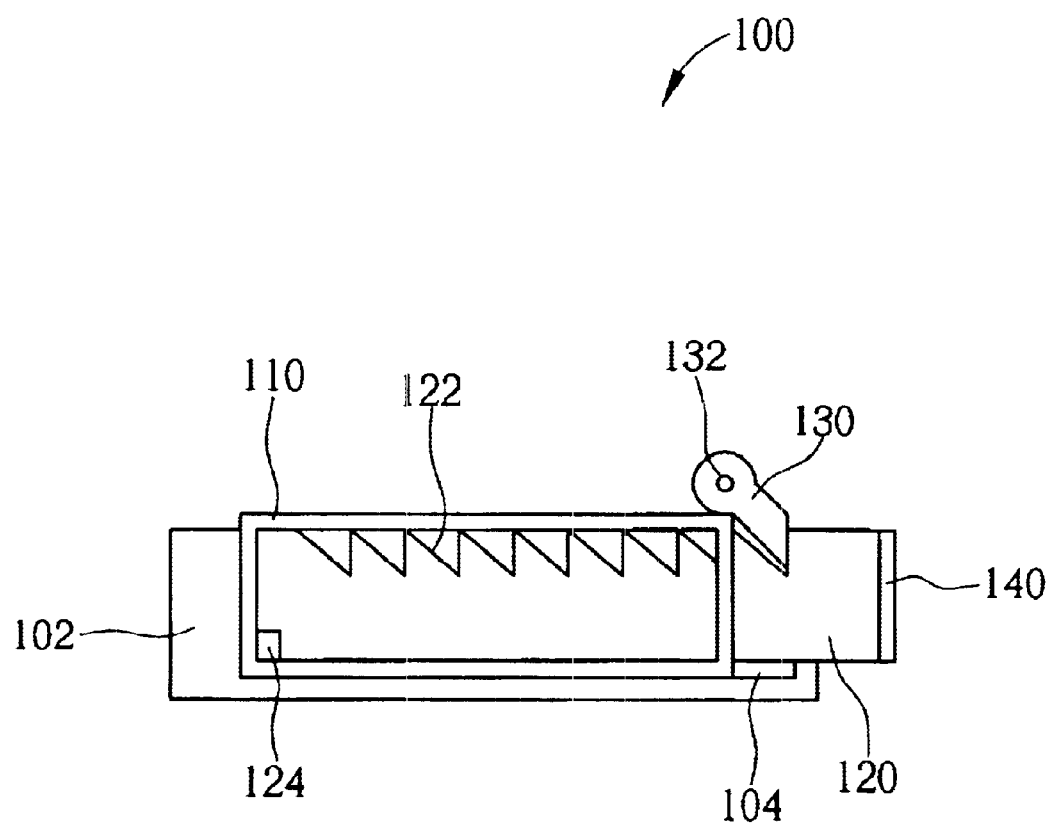
FIG. 8 to FIG. 13 are side views of the support stand being extended and retracted according to the present invention.
Figure 14:
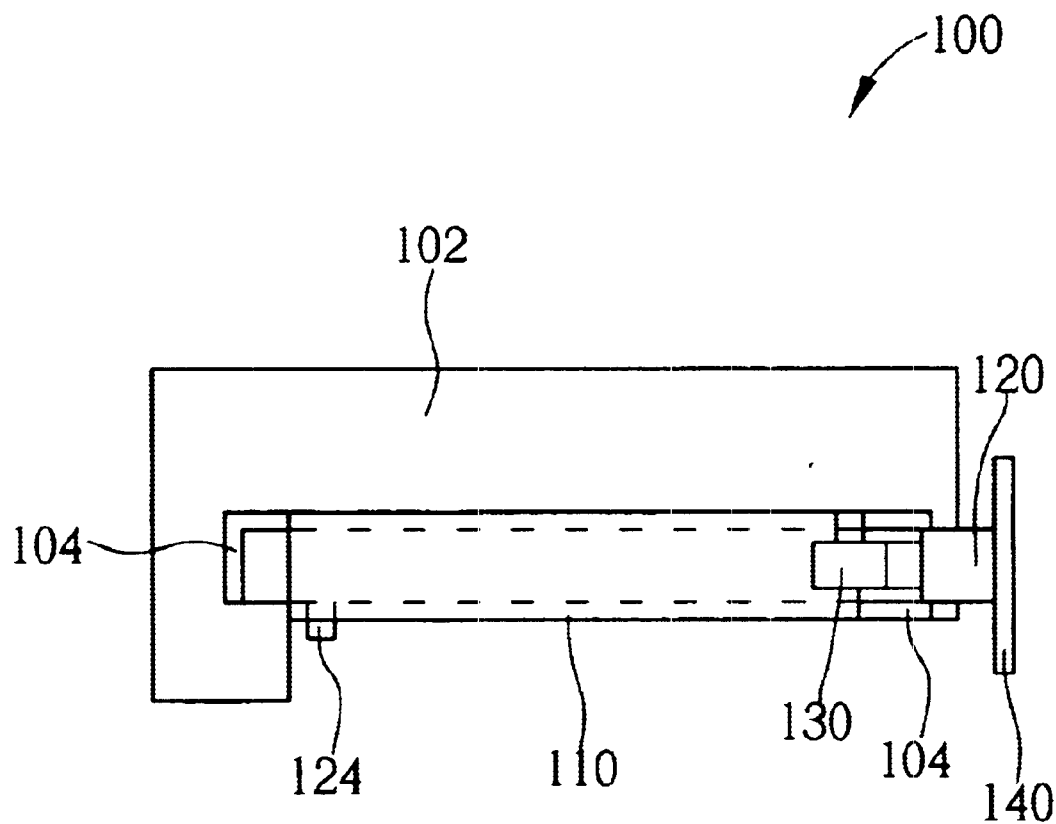
FIG. 14 to FIG. 19 are top views of the support stand being extended and retracted according to the sent invention.

Operation of the support stand 100 can be illustrated in six steps. FIG. 2, FIG. 8, and FIG. 14 all show the ratchet 120 in a fully retracted position inside the casing 110. Notice that the protruding edge 124 is resting against an inner end of the casing 110, preventing the ratchet 120 from being retracted any further. Moreover, the casing 110 is positioned against an inner end of the cavity 104. The pawl 130 engages with one of the teeth 122 of the outer end of the ratchet 120.

Figure 3:
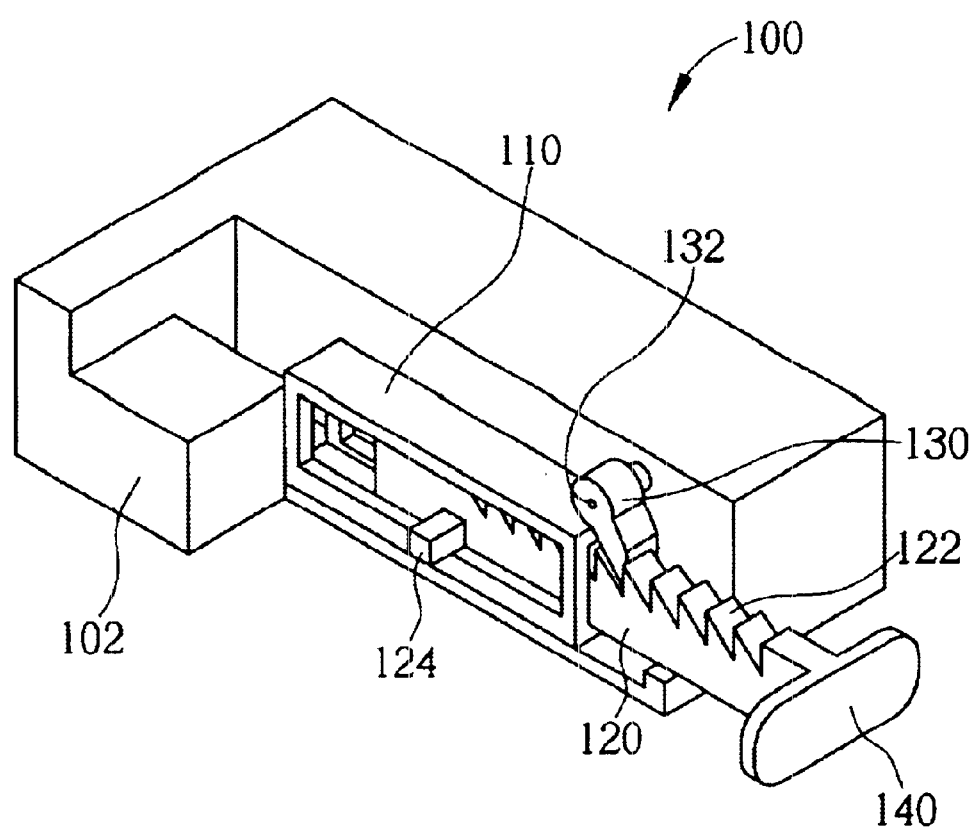
Figure 9:
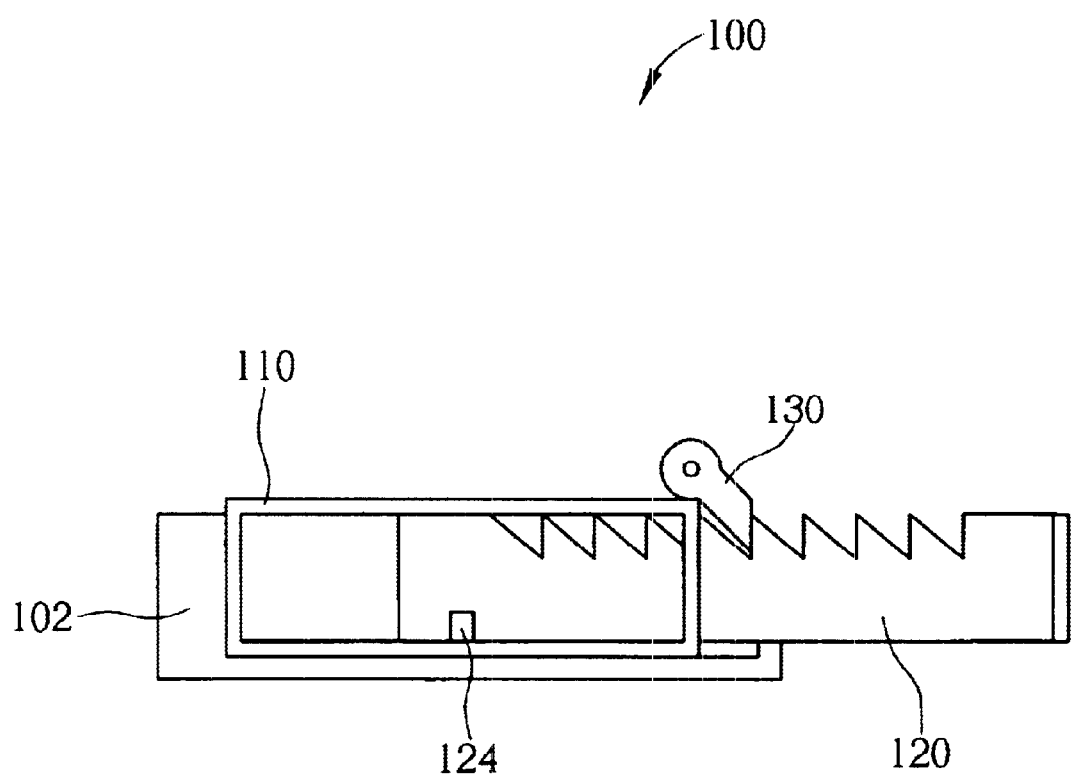
Figure 15:
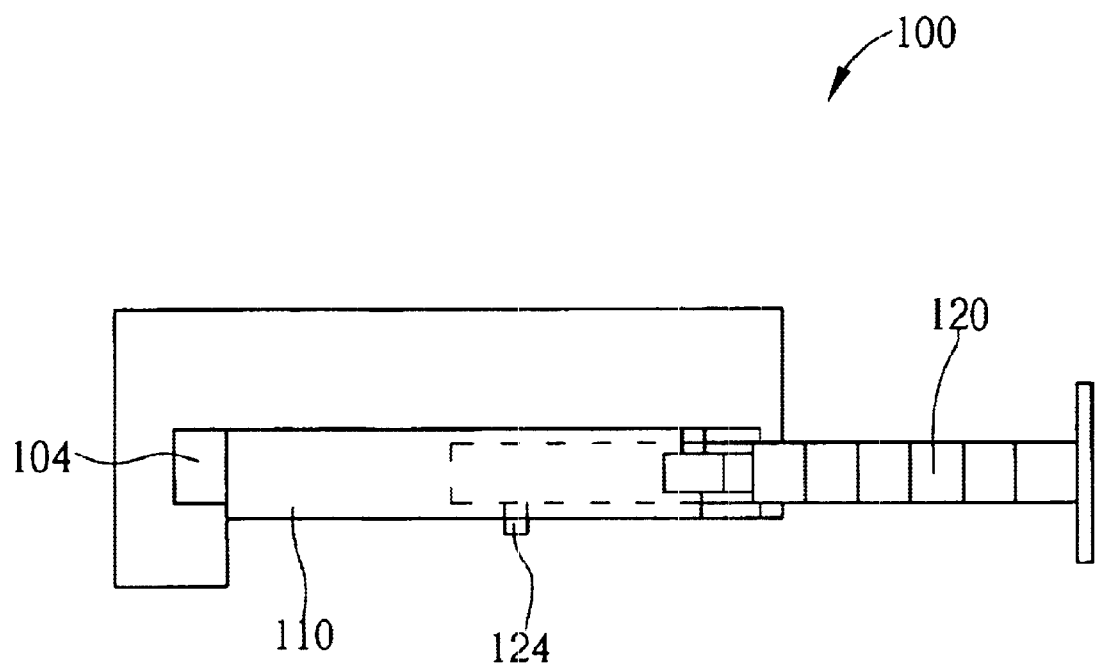

FIG. 3, FIG. 9, and FIG. 15 show the support stand 100 in which the ratchet 120 has been extended halfway out of the casing 110. At this time, the protruding edge 124 is roughly halfway between the two ends of the casing 110. The casing 110 is still positioned against an inner end of the cavity 104, and the pawl 130 engages with one of the teeth 122 of the middle section of the ratchet 120.

Figure 4:
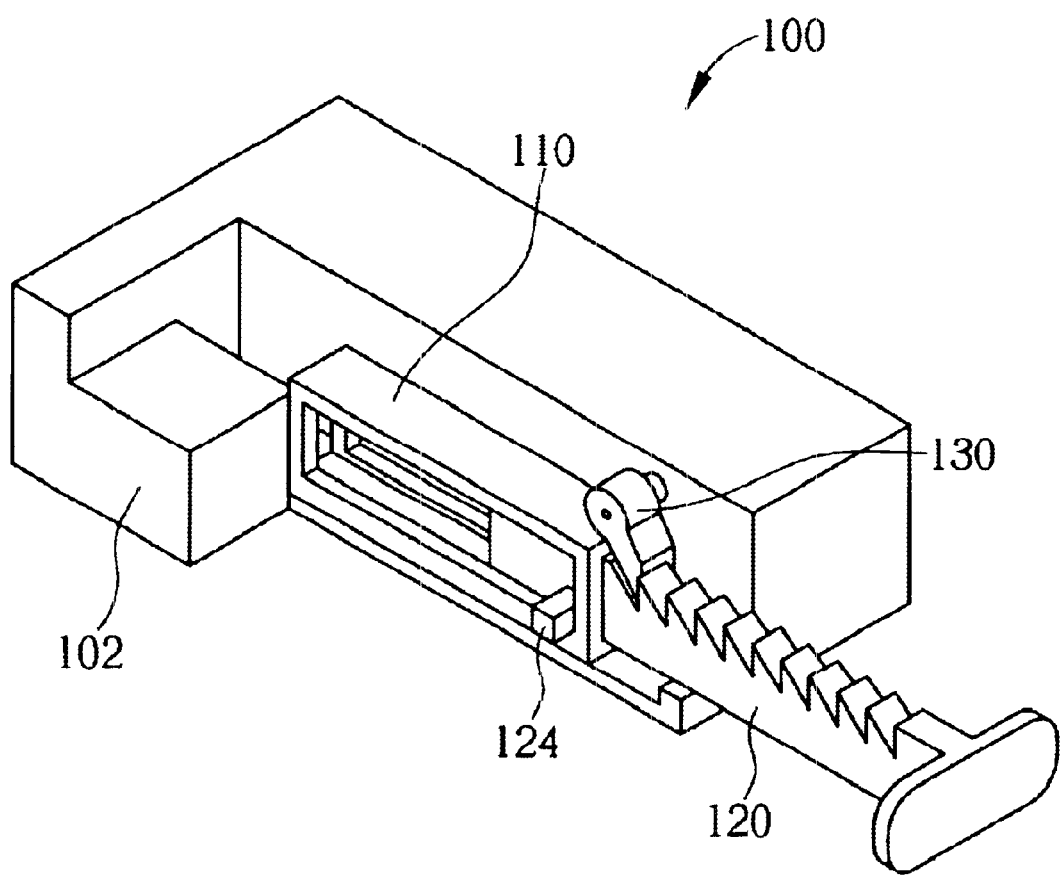
Figure 10:
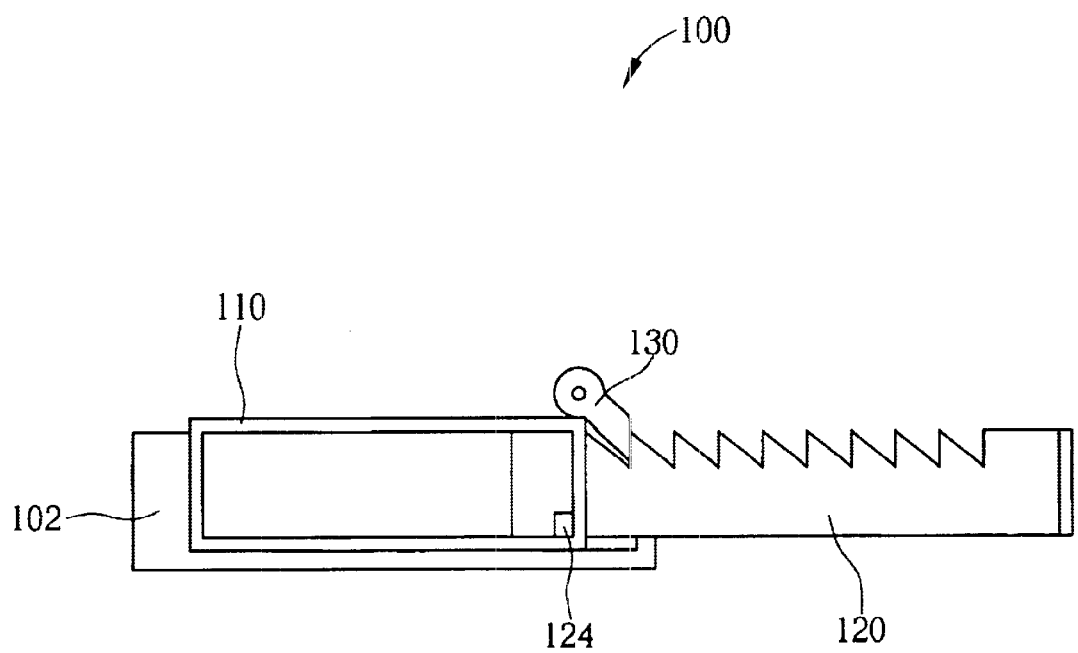
Figure 16:
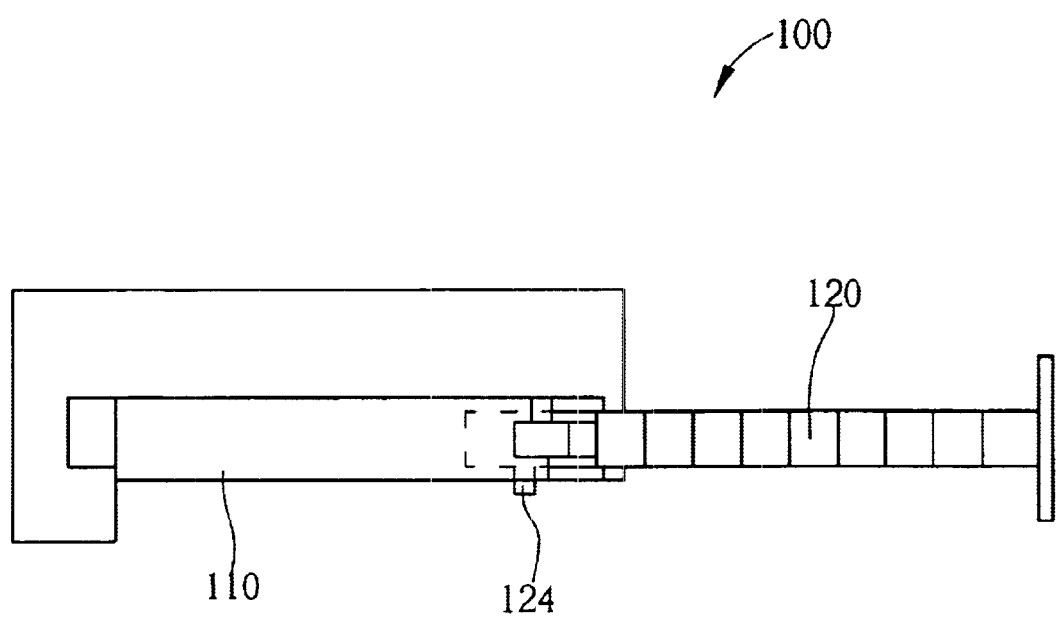

FIG. 4, FIG. 10, and FIG. 16 show the support stand 100 in which the ratchet 120 has been extended to the outer end of the casing 110. At this time, the protruding edge 124 is resting against the outer end of the casing 110, preventing the ratchet 120 from being extended any farther with respect to the casing 110. The casing 110 is still positioned against an inner end of the cavity 104, and the pawl 130 engages with one of the teeth 122 of the inner end of the ratchet 120.

Figure 5:
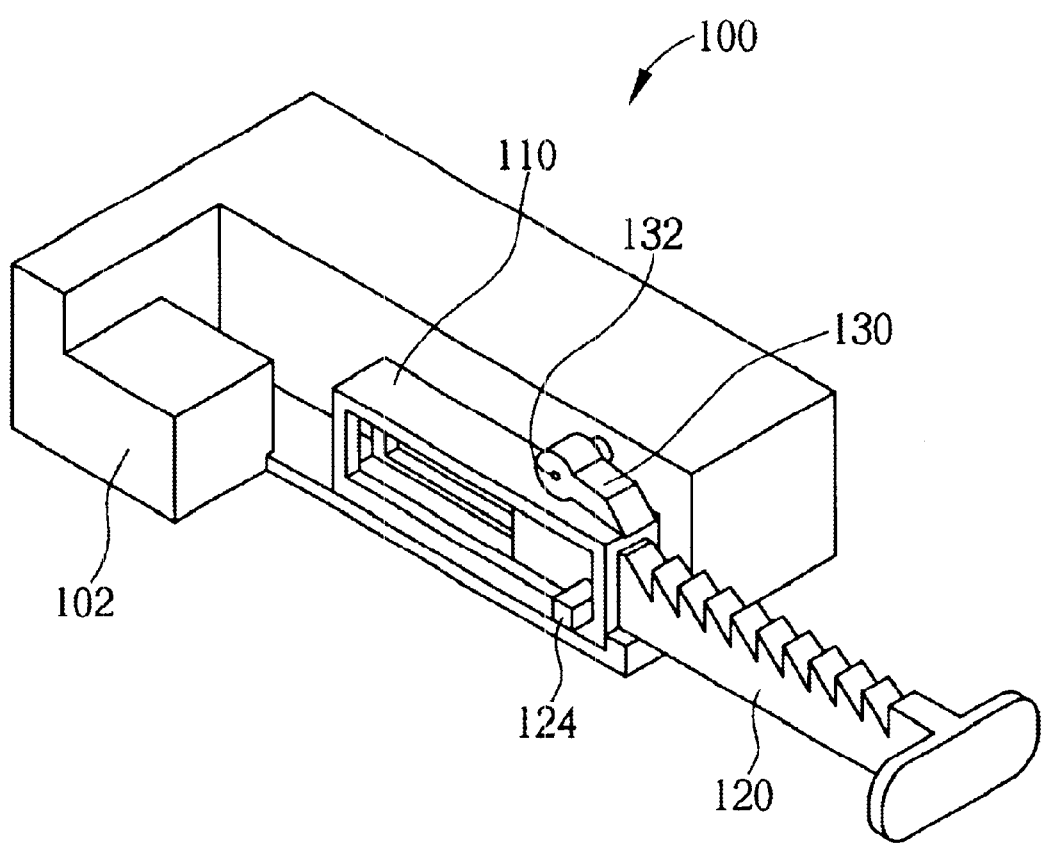
Figure 11:
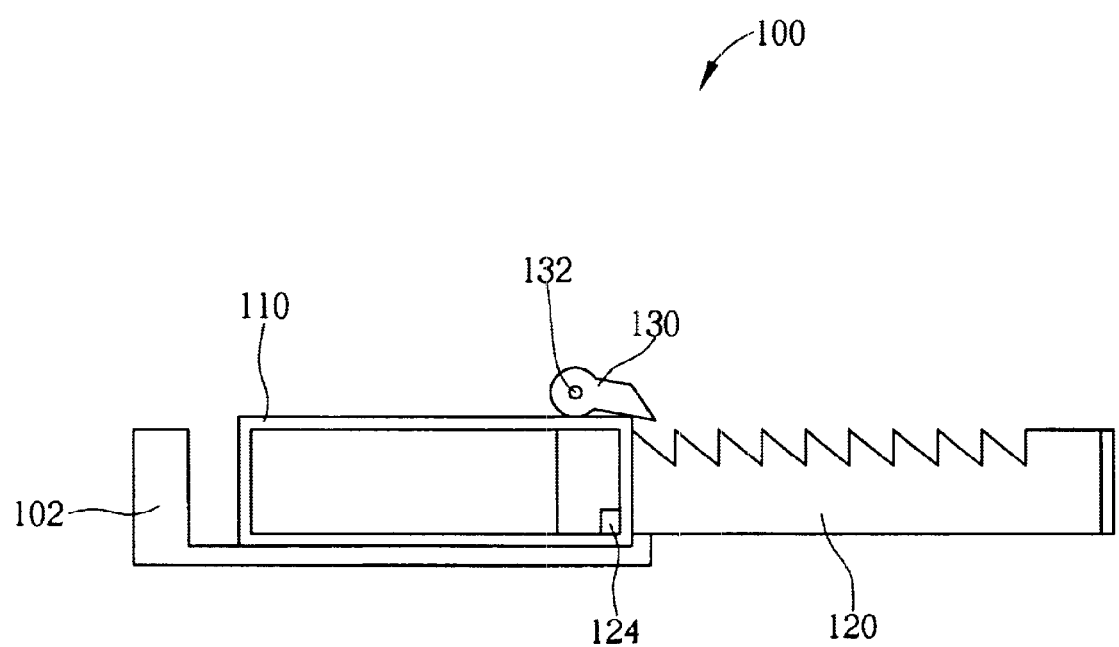
Figure 17:
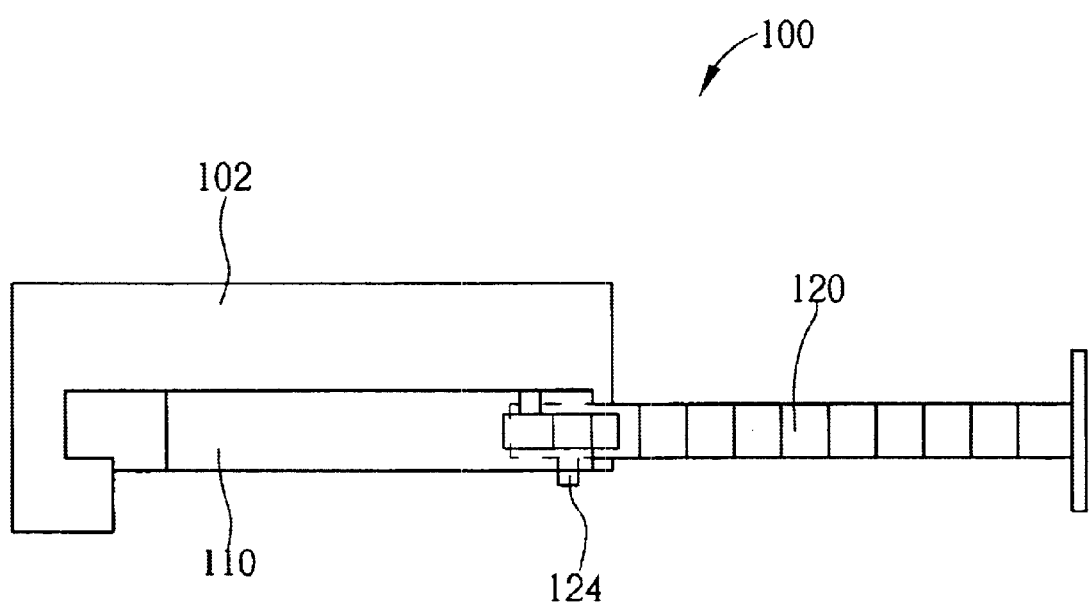

FIG. 5, FIG. 11, and FIG. 17 show the support stand 100 in which the ratchet 120 has been fully extended. As in the previous step, the ratchet 120 has been extended to the outer end of the casing 110. However, compared to the previous step, the ratchet 120 has been pulled out even farther, causing the protruding edge 124 to pull the casing 110 to the outer edge of the cavity 104. The casing 110 has moved outward with respect to the housing 102, but the pawl 130 has stayed in a fixed position with respect to the housing 102 since it is fixed at the pivot point 132. When the casing 110 moves outward, the casing 110 rotates the pawl 130 and disengages the pawl 130 from the teeth 122 of the ratchet 120. Since the pawl 130 is now disengaged from the teeth 122, the ratchet 120 can easily be pushed back into the casing 110.

Figure 6:
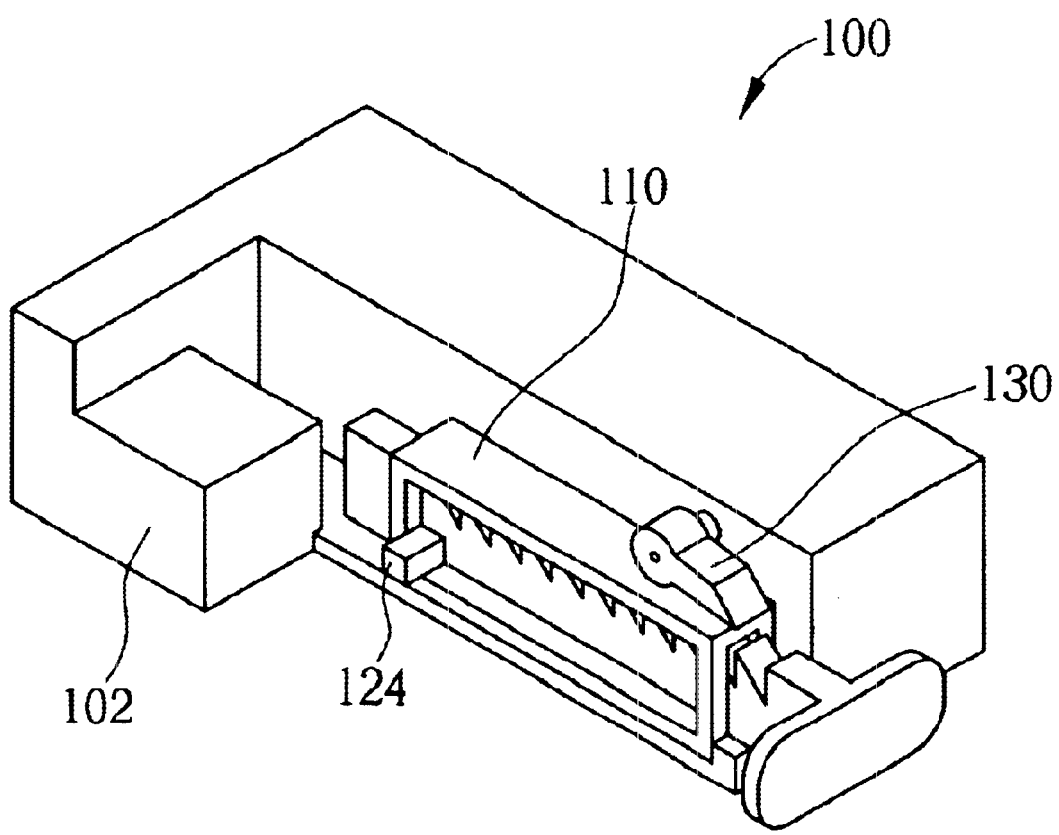
Figure 12:
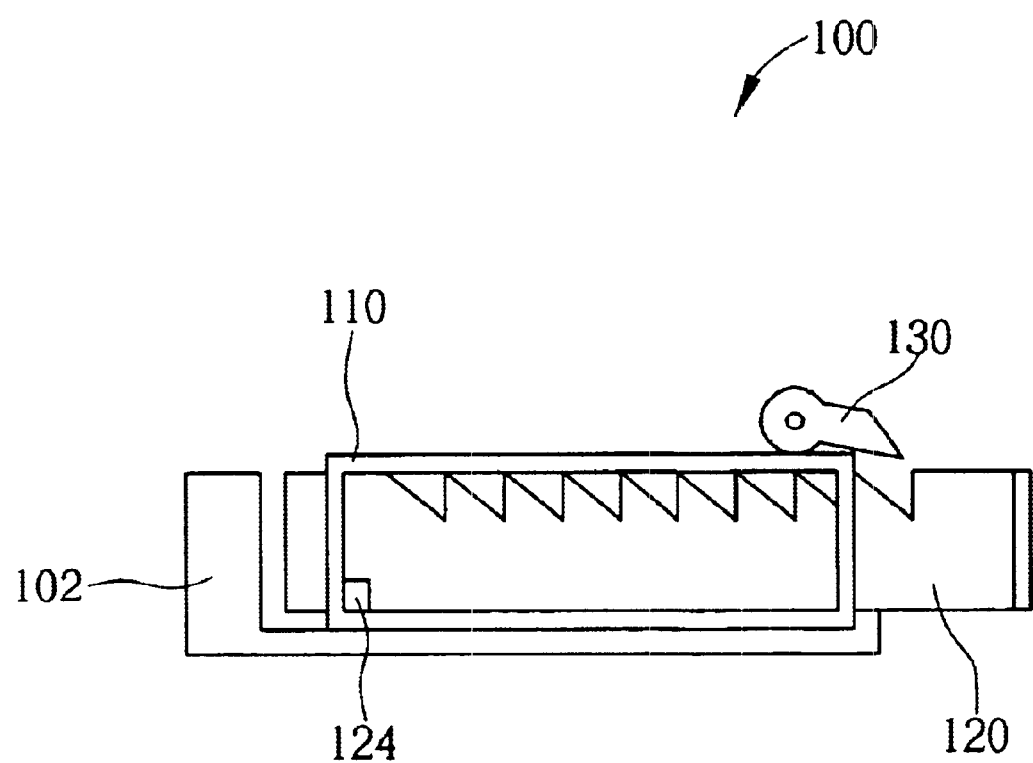
Figure 18:
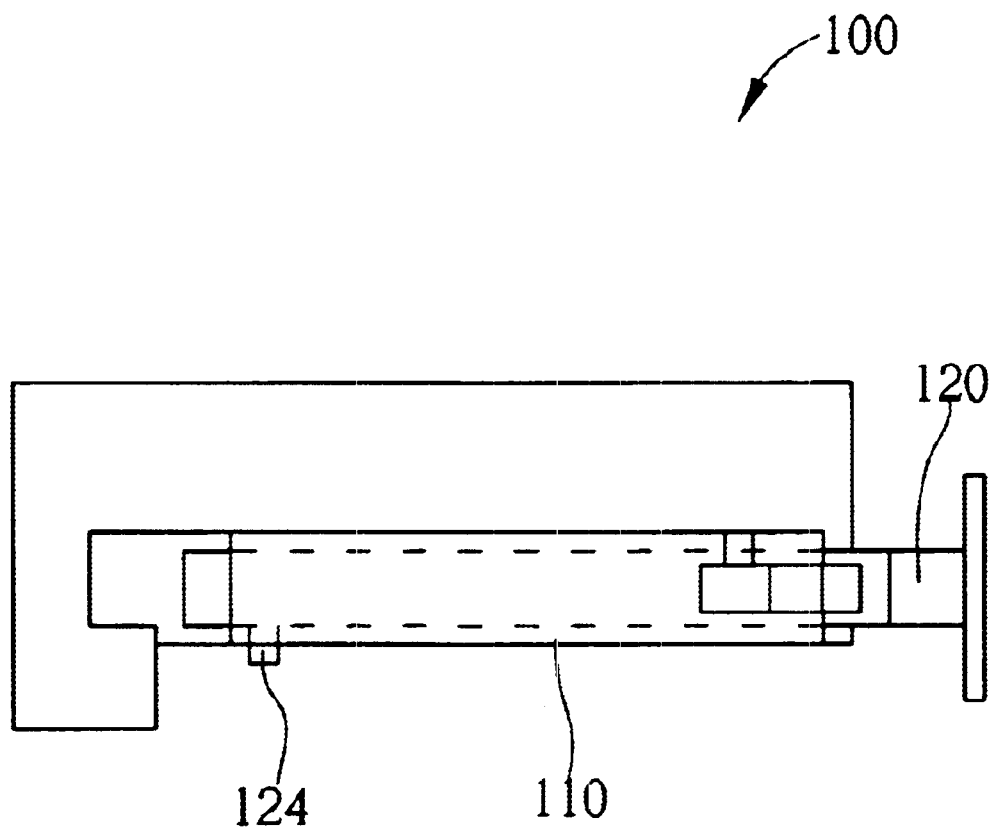

FIG. 6, FIG. 12, and FIG. 18 show the support stand 100 in which the ratchet 120 has been pushed back into the casing 110 until the protruding edge 124 contacts the inner end of the casing 110. At this point, the casing 110 is still resting against an outer end of the cavity 104 since friction between the casing 110 and the cavity 104 is greater than friction between the ratchet 120 and the casing 110. In addition, the pawl 130 is still disengaged from the teeth 122 of the ratchet 120, allowing the ratchet 120 to be retracted.

Figure 7:
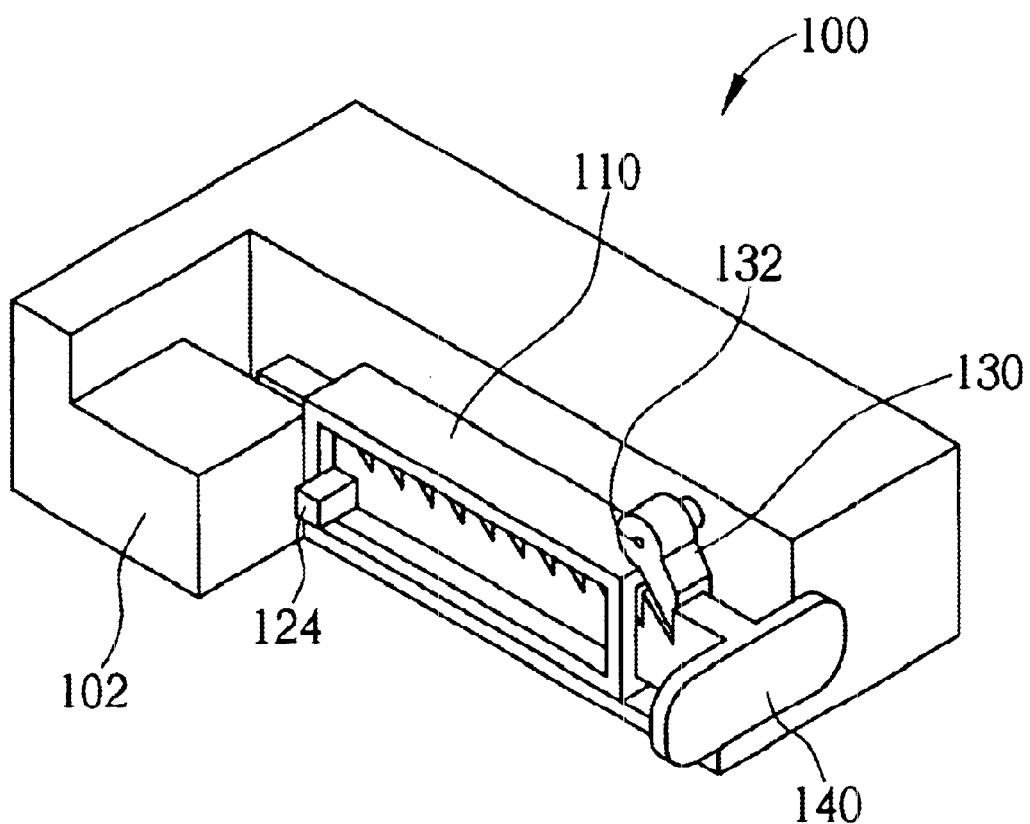
Figure 13:
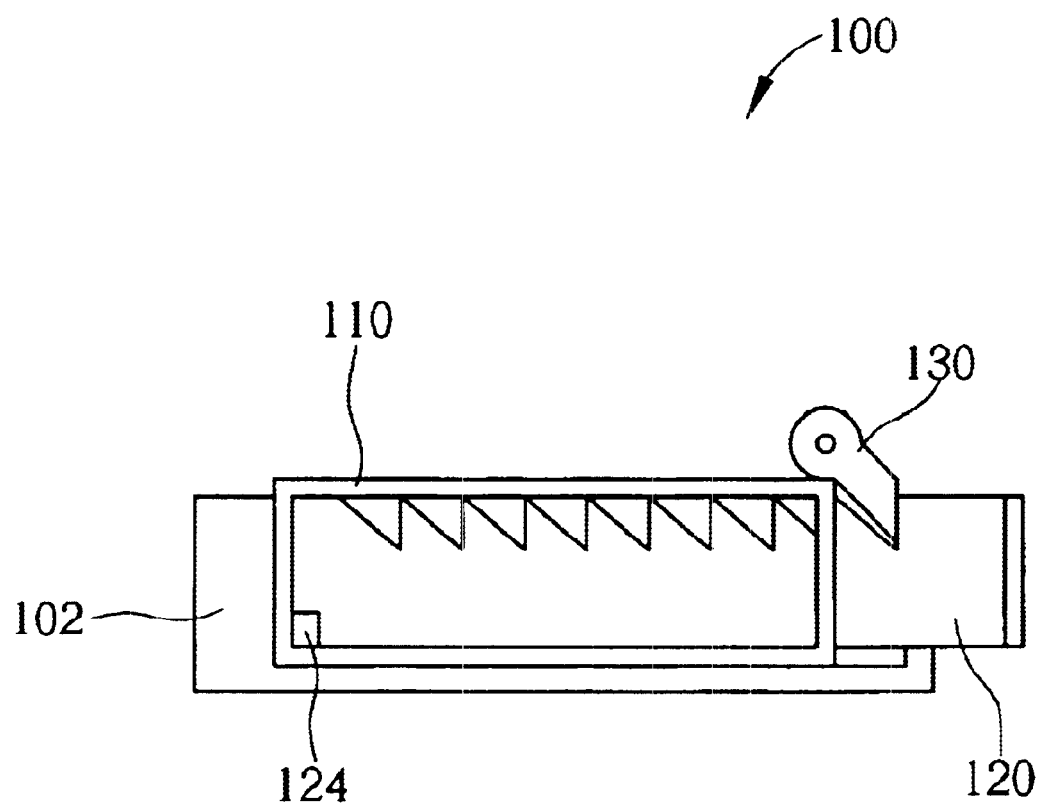
Figure 19:
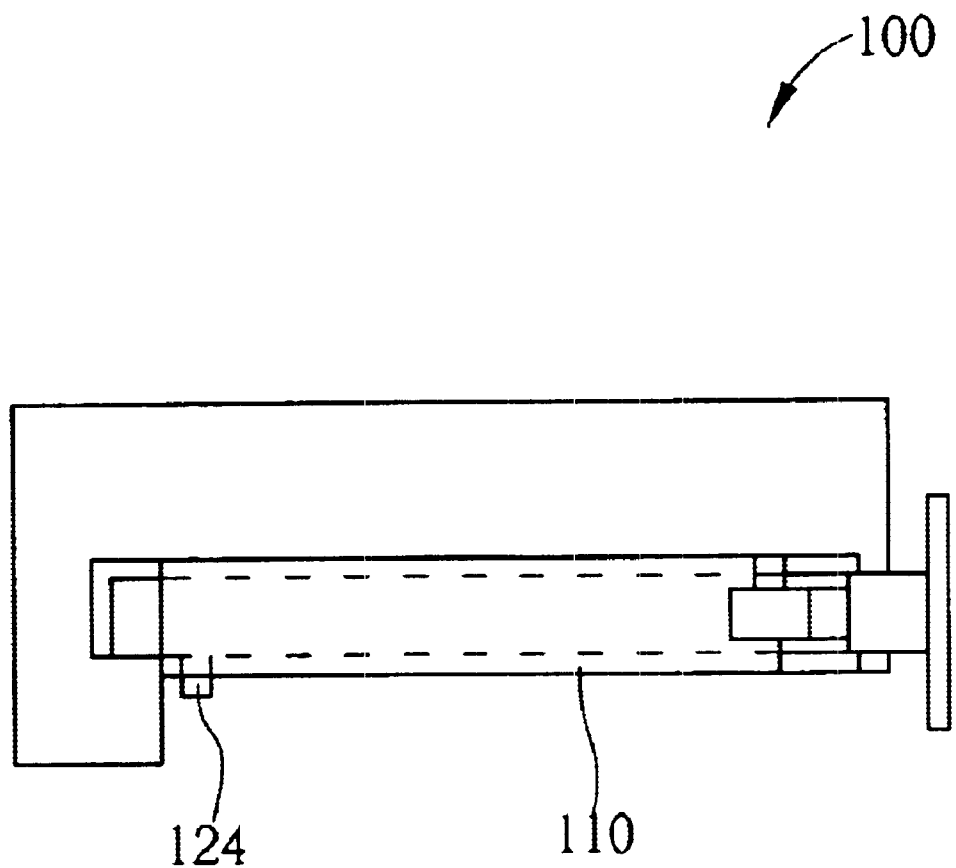

FIG. 7, FIG. 13, and FIG. 19 show the support stand 100 in which the ratchet 120 has been pushed further back, causing the protruding edge 124 to push the casing 110 so that the casing 110 contacts the inner end of the cavity 104. In addition, as the casing 110 moves to the inner end of the cavity 104, the pawl 130 rotates downwards and reengages with the teeth 122 of the ratchet 120. Notice that the result of this final step returns the support stand 100 to the same position that is shown in FIG. 2, FIG. 8, and FIG. 14.

A key feature of the support stand 100 is that the ratchet 120 can be extended using one hand. As the ratchet 120 is extended from the casing 110, the pawl 130 engages with successive teeth 122 of the ratchet 120. As the ratchet 120 is fully extended, the casing 110 disengages the pawl 130 from the teeth 122. Therefore, the ratchet 120 can also be retracted into the casing 110 using only one hand.

Please refer to FIG. 20 to FIG. 25. FIG. 20 to FIG. 25 are perspective views of a support stand 200 being extended and retracted according to a second embodiment of the present invention. The only difference between the support stand 100 and the support stand 200 is the support stand 200 contains a spring 250 formed between a base 240 of the support stand 200 and a housing 202 of a device that the support stand 200 is formed in.

A casing 210 is formed inside a cavity of the housing 202. A ratchet 220 is formed inside the casing 210 with the ratchet 220 containing a protruding edge 224 for keeping the ratchet 220 inside the casing 210. The ratchet 220 contains a plurality of teeth 222 for adjusting a height of the support stand 200.

A pawl 230 is connected to the housing 202 through a pivot point 232 in the pawl 230. The pawl 230 has a built-in spring mechanism that causes the pawl 230 to rotate towards the teeth 222 of the ratchet 220 for engaging the pawl 230 with the teeth 222. As the ratchet 220 is extended out of the casing 210, the pawl 230 engages with successive teeth 222 of the ratchet 220.

Figure 20:
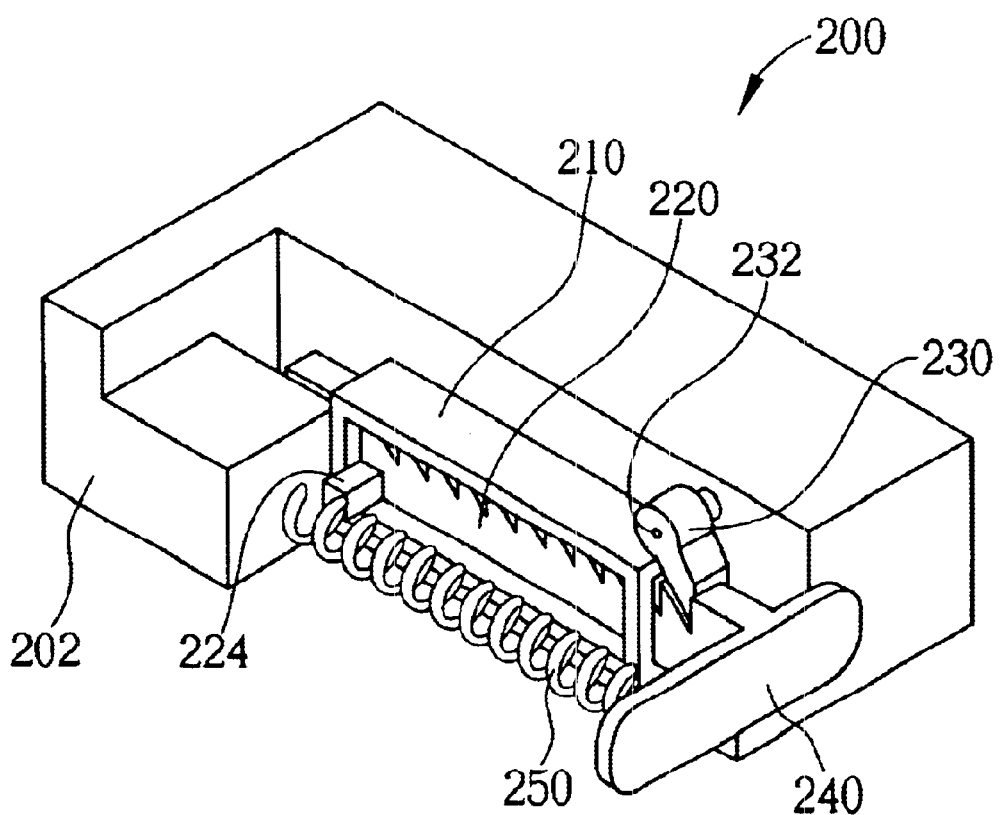
FIG. 20 to FIG. 25 are perspective views of a support stand being extended and retracted according to a second embodiment of the present invention.
Figure 21:
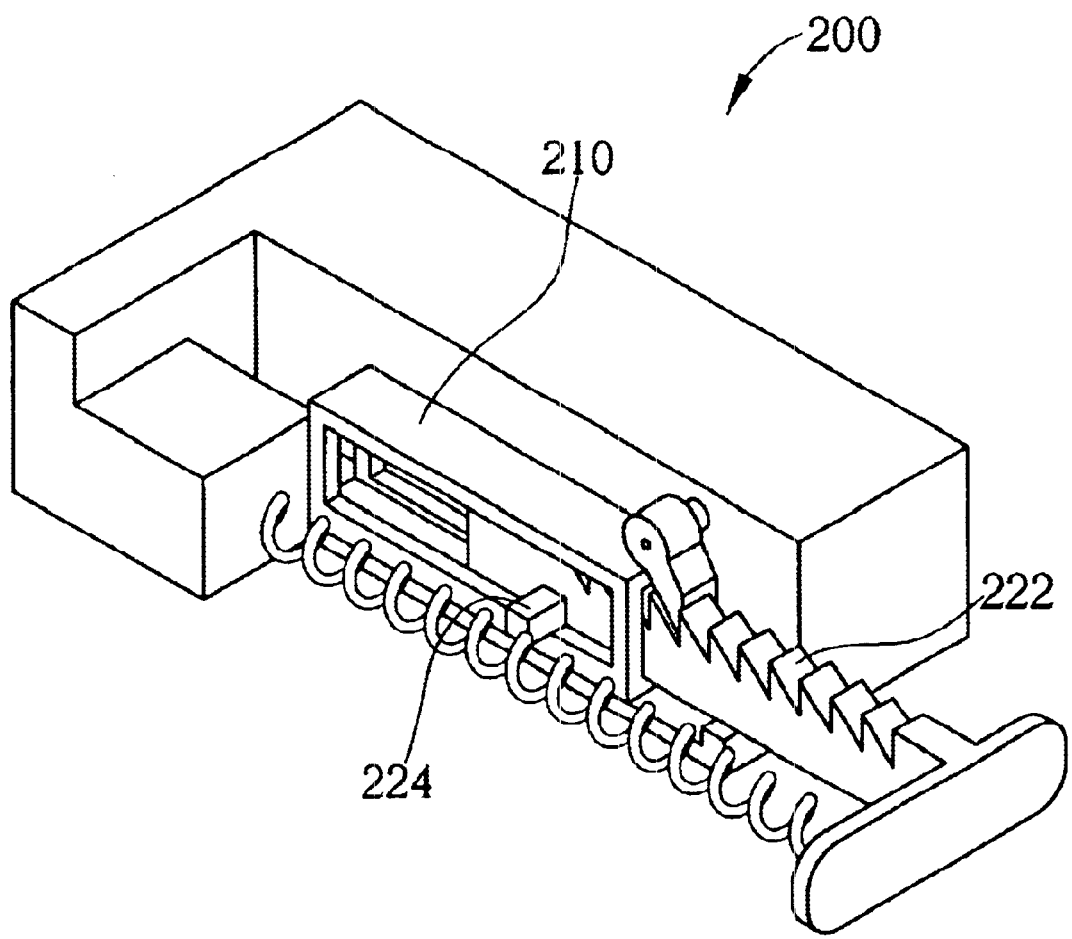
Figure 22:
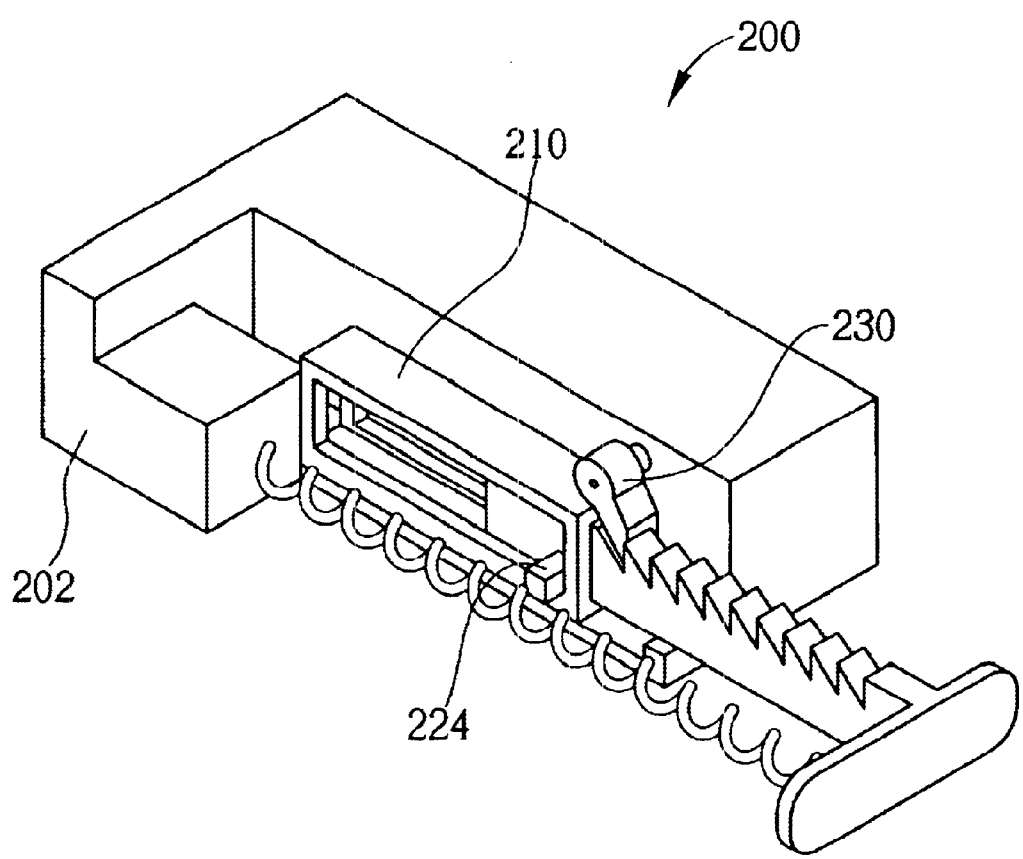
Figure 23:
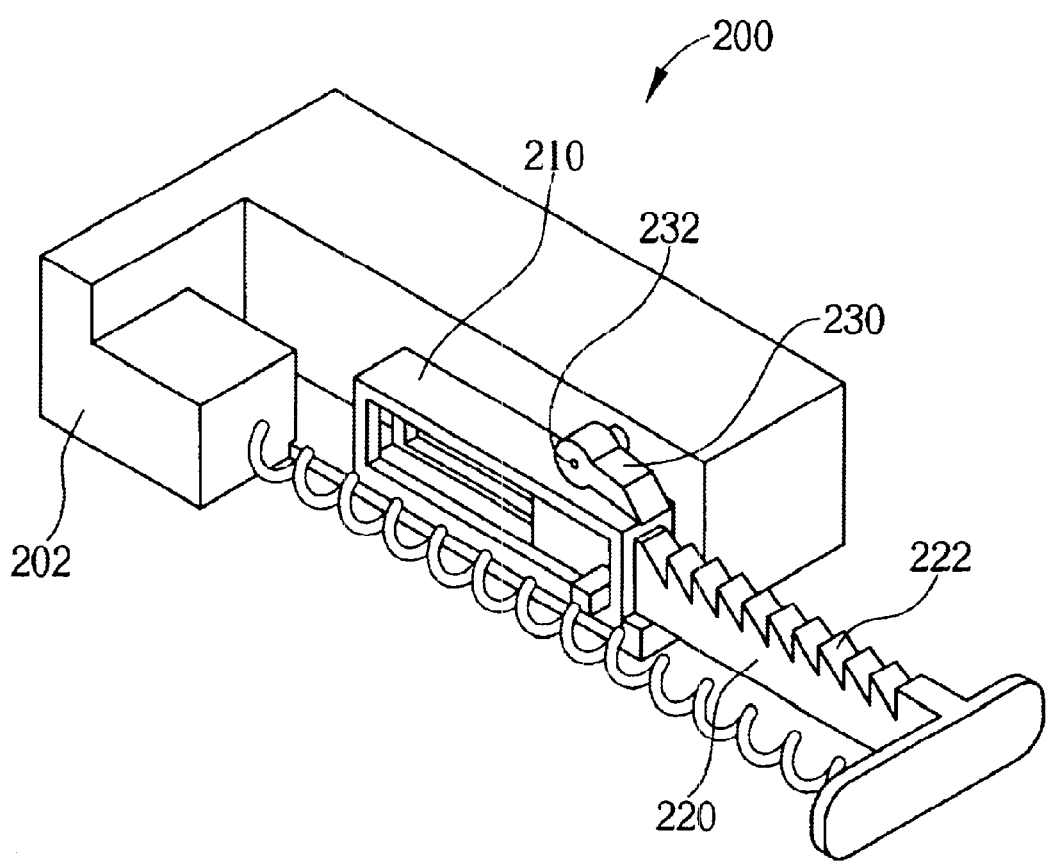
Figure 24:
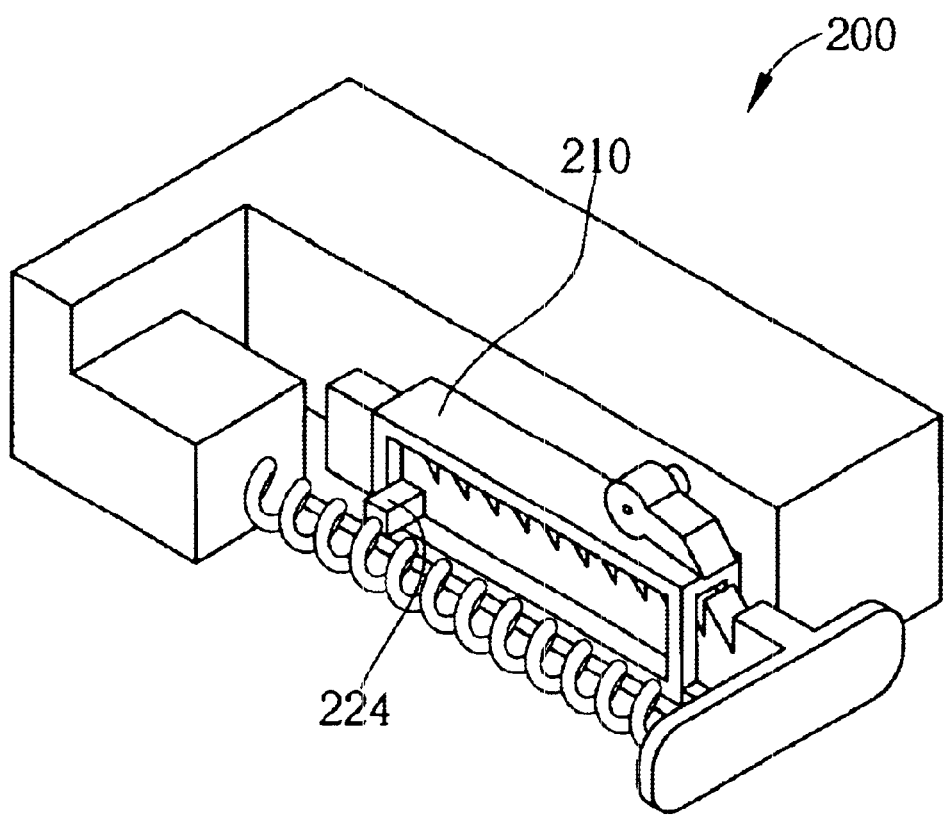
Figure 25:
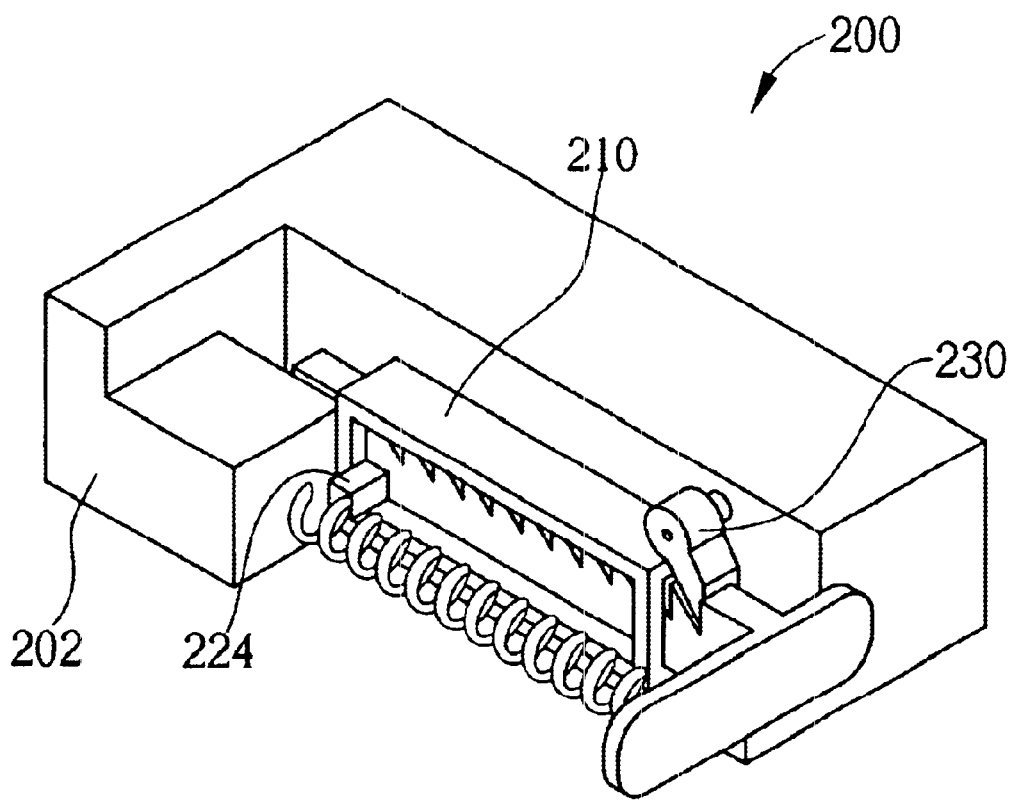

The support stand 200 functions similar to the support stand 100, with the only difference being how the ratchet 220 is retracted into the casing 210. In FIG. 20 to FIG. 22, the ratchet 220 is pulled out from the casing 210 until the protruding edge 224 of the ratchet 220 makes contact with an outer end of the casing 210. In FIG. 23, the ratchet 220 is pulled out farther, causing the casing 210 to contact an outer end of the cavity of the housing 202. At the same time, the pawl 230 is rotated by the casing 210 and disengages from the teeth 222. With the pawl 230 disengaged from the teeth 222, the spring 250 pulls the ratchet 220 back into the casing 210, as shown in FIG. 24. Finally, the protruding edge 224 pushes the casing 210 back into an inner end of the cavity of the housing 202, and the support stand 200 is restored to its original position that is shown in FIG. 20. Therefore, with the use of the spring 250, the support stand 200 can automatically retract after being fully extended.

Compared to the prior art the present invention support stand can easily be extended and retracted using one hand. After the ratchet is fully extended, the pawl disengages from the teeth, simplifying the process of retracting the ratchet back into the casing. Thus, the support stand can be conveniently retracted in one motion if no spring is used, or the support stand can be retracted automatically if a spring is incorporated into the design.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An adjustable support stand for adjusting a height of a device, the device comprising a housing and a cavity in the housing, the support stand comprising:
    a ratchet casing capable of moving along a linear direction within the cavity of the housing, the cavity having a first inner end and a first outer end for limiting the ability of the ratchet casing to move within the cavity in the linear direction;
    a ratchet disposed inside the ratchet casing, the ratchet comprising:
        a plurality of teeth; and
        a protruding edge for limiting the ability of the ratchet to move in the linear direction, wherein the protruding edge moves between a second inner end and a second outer end of the ratchet casing;
    a pawl for engaging the teeth of the ratchet, the pawl being connected to the housing at a pivot point for fixing the pawl to the housing and allowing the pawl to rotate about the pivot point, wherein the pawl rotates for engaging and disengaging with teeth of the ratchet;
    a biasing means for forcing the pawl to rotate towards the teeth of the ratchet about the pivot point; and
    a base formed on a third outer end of the ratchet for supporting the device on a surface, wherein the ratchet is capable of being pulled outwards from the ratchet casing for raising a height of the device, and the ratchet casing is capable of being pulled outward to disengage the pawl from the teeth of the ratchet for lowering the height of the device.

2. The support stand of claim 1 wherein when the ratchet is pulled out away from the device, the pawl engages with successive teeth of the ratchet.

3. The support stand of claim 2 wherein when the protruding edge of the ratchet is pulled against the second outer end of the ratchet casing, the second outer end of the ratchet casing moves away from the device until the second outer end of the ratchet casing presses against the first outer end of the cavity.

4. The support stand of claim 1 wherein when the second outer end of the ratchet casing presses against the first outer end of the cavity, the ratchet casing prevents the pawl from engaging with the teeth of the ratchet, and when the second outer end of the ratchet casing does not press against the first outer end of the cavity, the pawl is capable of engaging with the teeth of the ratchet for adjusting the height of the device.

5. The support stand of claim 4 wherein when the second outer end of the ratchet casing presses against the first outer end of the cavity and the ratchet casing prevents the pawl from engaging with the teeth of the ratchet, the ratchet is capable of being pushed into the ratchet casing.

6. The support stand of claim 5 wherein frictional force between the cavity and the ratchet casing is greater than frictional force between the ratchet casing and the ratchet, and the ratchet is capable of being pushed into the ratchet casing without pushing the ratchet casing into the cavity.

7. The support stand of claim 5 wherein when the protruding edge of the ratchet is pushed against the second inner end of the ratchet casing, the second inner end of the ratchet casing moves towards the device until the second inner end of the ratchet casing presses against the first inner end of the cavity and the pawl reengages with the teeth of the ratchet.

8. The support stand of claim 5 further comprising an elastic device connected between the housing of the device and the base for pulling the ratchet into the ratchet casing when the pawl is prevented from engaging with the teeth of the ratchet.

9. The support stand of claim 8 wherein the elastic device is a helical spring.

* * * * *